(12) United States Patent
Pugh et al.

(10) Patent No.: US 11,861,361 B2
(45) Date of Patent: Jan. 2, 2024

(54) DISTINGUISHING PATTERN DIFFERENCES FROM NON-PATTERN DIFFERENCES

(71) Applicant: Microsoft Technology Licensing, LLC, Redmond, WA (US)

(72) Inventors: David Ellis Pugh, Bellevue, WA (US); Mark Alistair Wilson-Thomas, Mercer Island, WA (US); Vu Minh Le, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 17/568,597

(22) Filed: Jan. 4, 2022

(65) Prior Publication Data

US 2023/0214212 A1 Jul. 6, 2023

(51) Int. Cl.
*G06F 8/71* (2018.01)
*G06F 40/197* (2020.01)

(52) U.S. Cl.
CPC .............. *G06F 8/71* (2013.01); *G06F 40/197* (2020.01)

(58) Field of Classification Search
CPC ..... G06F 8/71; G06F 8/33; G06F 8/72; G06F 9/451
USPC ........................................................ 717/121
See application file for complete search history.

(56) References Cited

U.S. PATENT DOCUMENTS

2015/0169995 A1* 6/2015 Panferov .............. G06V 30/414
382/220

OTHER PUBLICATIONS

"International Search Report and Written Opinion Issued in PCT Application No. PCT/US22/048329", dated Feb. 10, 2023, 14 Pages.
Thangthumachit, et al., "Understanding Source Code Differences by Separating Refactoring Effects", In Proceedings of 18th Asia-Pacific Software Engineering Conference, Dec. 5, 2011, pp. 339-347.

* cited by examiner

*Primary Examiner* — John Q Chavis
(74) *Attorney, Agent, or Firm* — WORKMAN NYDEGGER (57) ABSTRACT

Distinguishing pattern differences from non-pattern differences. A set of differences is identified. The set comprises a plurality of differences between first and second versions of a document. A pattern is identified. The pattern explains a transformation from a first string in the first version of the document to a second string in the second version of the document. A subset of differences are identified. The subset comprises a plurality of differences, from among the set, which match the pattern. While presenting a user interface that visually highlights differences between the first and second versions of the document, a first visual treatment is applied to a first difference, based on the first difference being included in the subset. A second visual treatment is also applied to a second difference, based on the second difference being excluded from the subset. The second visual treatment is different than the first visual treatment.

20 Claims, 8 Drawing Sheets

![Integrated Development Environment showing a diff view of Program.cs - V1 and Program.cs - V2]

```
Integrated Development Environment                                    _ □ X
File   Edit   View   Git   Project   Build   Debug   Test   Analyze   Tools   Extensions   Window   Help
DIFF - Program.cs   X
Program.cs - V1                                          Program.cs - V2
11  static void Main(string[] args)              301 △   11  static void Main(string[] args)              302 △
12  {                                                    12  {
13    list<double> fTemps = new List<Double>();           13    list<double> tempsInF = new List<Double>();
14    list<double> cTemps = new List<Double>();           14    list<double> tempsInC = new List<Double>();
15                                                        15
16    foreach (string s in args)                          16    foreach (string s in args)
17    {                                                   17    {
18      if (s != null)                                    18      if (s != null)
19      {                                                 19      {
20        if (s.Length > 0 && s.Substring(s.Length - 1).Equals("F  20        if (s.Length > 0 && s.Substring(s.Length - 1).Equals("F
21        {                                               21        {
22          string tempFString = s.Substring(0, s.Length - 1);    22          string tempFString = s.Substring(0, s.Length - 1);
23          double tempF = System.Convert.toDouble(tempFString)   23          double tempF = System.Convert.toDouble(tempFString)
24          fTemps.Add(tempF);                            24          tempsInF.Add(tempF);
25                                                        25
26          Console.WriteLine((tempF - 32) * (5.0 / 9.0)); 26          Console.WriteLine(ToC(tempF));
27        }                                               27        }
28                                                        28
29      }                                                 29      }
30      if (s.Length > 0 && s.Substring(s.Length - 1).Equals("C") 30      if (s.Length > 0 && s.Substring(s.Length - 1).Equals("C")
31      {                                                 31      {
32        string.tempCString = s.Substring(0, s.Length - 1);      32        string.tempCString = s.Substring(0, s.Length - 1);
33        double tempC = System.Covert.ToDouble(tempCString);     33        double tempC = System.Covert.ToDouble(tempCString);
34        cTemps.Add(tempC);                              34        tempsInC.Add(tempC);
35                                                        35
36        Console.WriteLine(tempC * (9.0 / 5.0) + 32);    36        Console.WriteLine(tempC * (9.0 / 5.0) + 32);
37      }                                                 37      }
38    }                                                   38    }
39  }                                                     39  }
40  if (fTemps.Count != 0)                                40  if (tempsInF.Count != 0)
41  {                                                     41  {
42    Console.WriteLine(MinTempInF(fTemps));              42    Console.WriteLine(MinTempInF(tempsInF));
43    Console.WriteLine(MaxTempInF(fTemps));              43    Console.WriteLine(MaxTempInF(tempsInF));
44  }                                                     44  }
45  if (cTemps.Count != 0)                                45  if (tempsInC.Count != 0)
46  {                                                     46  {
47    Console.WriteLine(MinTempInC(cTemps));              47    Console.WriteLine(MinTempInC(tempsInC));
48    Console.WriteLine(MaxTempInC(cTemps));              48    Console.WriteLine(MaxTempInC(tempsInC));
```

```
┌─────────────────────────────────────── Integrated Development Environment ───────────────────────────── _ □ X ┐
│ File  Edit  View  Git  Project  Build  Debug  Test  Analyze  Tools  Extensions  Window  Help              │
│ DIFF - Program.cs   X                                                                                      │
├───────────────────────────────────────────────┬────────────────────────────────────────────────────────────┤
│ Program.cs - V1                               │ Program.cs - V2                                            │
│ 11  static void Main(string[] args)     301 △ │ 11  static void Main(string[] args)                 302 △  │
│ 12  {                                         │ 12  {                                                      │
│ 13    List<double> fTemps = new List<Double>();│ 13    List<double> tempsInF = new List<Double>();         │
│ 14    List<double> cTemps = new List<Double>();│ 14    List<double> tempsInC = new List<Double>();         │
│ 15                                            │ 15                                                         │
│ 16    foreach (string s in args)              │ 16    foreach (string s in args)                           │
│ 17    {                                       │ 17    {                                                    │
│ 18      ░░░░░░░░░░░░░░░                       │ 18      ░░░░░░░░░░░░░░░                                    │
│ 19      {                                     │ 19      {                                                  │
│ 20        if (s.Length > 0 && s.Substring(s.Length - 1).Equals("F│ 20        if (s.Length > 0 && s.Substring(s.Length - 1).Equals("F│
│ 21        {                                   │ 21        {                                                │
│ 22          string tempFString = s.Substring(0, s.Length - 1);│ 22          string tempFString = s.Substring(0, s.Length - 1);│
│ 23          double tempF = System.Convert.toDouble(tempFString);│ 23          double tempF = System.Convert.toDouble(tempFString);│
│ 24          fTemps.Add(tempF)                 │ 24          tempsInF.Add(tempF)                            │
│ 25                                            │ 25                                                         │
│ 26          Console.WriteLine((tempF - 32 ) * (5.0 / 9.0));│ 26          Console.WriteLine(FtoC(tempF));               │
│ 27        }                                   │ 27        }                                                │
│ 28                                            │ 28                                                         │
│ 29      }                                     │ 29      }                                                  │
│ 30      if (s.Length > 0 && s.Substring(s.Length - 1).Equals("C"│ 30      if (s.Length > 0 && s.Substring(s.Length - 1).Equals("C"│
│ 31      {                                     │ 31      {                                                  │
│ 32        string.tempCString = s.Substring(0, s.Length - 1);│ 32        string.tempCString = s.Substring(0, s.Length - 1);│
│ 33        double tempC = System.Covert.ToDouble(tempCString);│ 33        double tempC = System.Covert.ToDouble(tempCString);│
│ 34        cTemps.Add(tempC);                  │ 34        tempsInC.Add(tempC);                             │
│ 35                                            │ 35                                                         │
│ 36        Console.WriteLine(tempC * (9.0 / 5.0) + 32);│ 36        Console.WriteLine(tempC * (9.0 / 5.0) + 32);    │
│ 37      }                                     │ 37      }                                                  │
│ 38    }                                       │ 38    }                                                    │
│ 39  }                                         │ 39  }                                                      │
│ 40  if (fTemps.Count != 0)                    │ 40  if (tempsInF.Count != 0)                               │
│ 41  {                                         │ 41  {                                                      │
│ 42    Console.WriteLine(MinTempInC(fTemps));  │ 42    Console.WriteLine(MinTempInC(tempsInF));             │
│ 43    Console.WriteLine(MaxTempInC(fTemps));  │ 43    Console.WriteLine(MaxTempInC(tempsInF));             │
│ 44  }                                         │ 44  }                                                      │
│ 45  if(cTemps.Count != 0)                     │ 45  if(tempsInC.Count != 0)                                │
│ 46  {                                         │ 46  {                                                      │
│ 47    Console.WriteLine(MinTempInF(cTemps));  │ 47    Console.WriteLine(MinTempInF(tempsInC));             │
│ 48    Console.WriteLine(MaxTempInF(cTemps));  │ 48    Console.WriteLine(MaxTempInF(tempsInC));             │
└───────────────────────────────────────────────┴────────────────────────────────────────────────────────────┘
```

```
┌─────────────────────────────────────────────────────────────────────────────────────┐
│                         Integrated Development Environment                    _ □ X │
├─────────────────────────────────────────────────────────────────────────────────────┤
│ File  Edit  View  Git  Project  Build  Debug  Test  Analyze  Tools  Extensions  Window  Help │
├─────────────────────────────────────────────────────────────────────────────────────┤
│ DIFF - Program.cs   X                                                               │
├──────────────────────────────────────────┬──────────────────────────────────────────┤
│ Program.cs - V1                          │ Program.cs - V2                          │
│                                          │                                          │
│ 11  static void Main(string[] args) 301 △│ 11  static void Main(string[] args) 302 △│
│ 12  {                                    │ 12  {                                    │
│ 13    List<double> fTemps = new List<Double>();│ 13    List<double> tempsInF = new List<Double>();│
│ 14    List<double> cTemps = new List<Double>();│ 14    List<double> tempsInC = new List<Double>();│
│ 15                                       │ 15                                       │
│ 16    foreach (string s in args)         │ 16    foreach (string s in args)         │
│ 17    {                                  │ 17    {                                  │
│ 18                                       │ 18                                       │
│ 19      {                                │ 19      {                                │
│ 20        if (s.Length > 0 && s.Substring(s.Length - 1).Equals("F│ 20        if (s.Length > 0 && s.Substring(s.Length - 1).Equals("F│
│ 21        {                              │ 21        {                              │
│ 22          string tempFString = s.Substring(0, s.Length - 1);│ 22          string tempFString = s.Substring(0, s.Length - 1);│
│ 23          double tempF = System.Convert.toDouble(tempFString);│ 23          double tempF = System.Convert.toDouble(tempFString);│
│ 24          fTemps.Add(tempF)            │ 24          tempsInF.Add(tempF)          │
│ 25                                       │ 25                                       │
│ 26  303  Console.WriteLine((tempF - 32 ) * (5.0 / 9.0));│ 26        Console.WriteLine(FtoC(tempF));│
│ 27        }                              │ 27        }                              │
│ 28                                       │ 28                                       │
│ 29      }                                │ 29      }                                │
│ 30        if (s.Length > 0 && s.Substring(s.Length - 1).Equals("C"│ 30        if (s.Length > 0 && s.Substring(s.Length - 1).Equals("C"│
│ 31        {                              │ 31        {                              │
│ 32          string.tempCString = s.Substring(0, s.Length - 1);│ 32          string.tempCString = s.Substring(0, s.Length - 1);│
│ 33          double tempC = System.Covert.ToDouble(tempCString);│ 33          double tempC = System.Covert.ToDouble(tempCString);│
│ 34          cTemps.Add(tempC);           │ 34          tempsInC.Add(tempC);         │
│ 35                                       │ 35                                       │
│ 36          Console.WriteLine(tempC * (9.0 / 5.0) + 32);│ 36          Console.WriteLine(tempC * (9.0 / 5.0) + 32);│
│ 37        }                              │ 37        }                              │
│ 38      }                                │ 38      }                                │
│ 39  }                                    │ 39  }                                    │
│ 40  if (fTemps.Count != 0)               │ 40  if (tempsInF.Count != 0)             │
│ 41  {                                    │ 41  {                                    │
│ 42    Console.WriteLine(MinTempInC(fTemps));│ 42    Console.WriteLine(MinTempInC(tempsInF));│
│ 43    Console.WriteLine(MaxTempInC(fTemps));│ 43    Console.WriteLine(MaxTempInC(tempsInF));│
│ 44  }                                    │ 44  }                                    │
│ 45  if(cTemps.Count != 0)                │ 45  if(tempsInC.Count != 0)              │
│ 46  {                                    │ 46  {                                    │
│ 47    Console.WriteLine(MinTempInF(cTemps));│ 47    Console.WriteLine(MinTempInF(tempsInC));│
│ 48    Console.WriteLine(MaxTempInF(cTemps));▽│ 48    Console.WriteLine(MaxTempInF(tempsInC));▽│
└──────────────────────────────────────────┴──────────────────────────────────────────┘
```

```
Integrated Development Environment                              _ □ X
File  Edit  View  Git  Project  Build  Debug  Test  Analyze  Tools  Extensions  Window  Help
DIFF - Program.cs  | X |
Program.cs - V1                                              Program.cs - V2
11  static void Main(string[] args)           301  △     11  static void Main(string[] args)           302  △
12  {                                                    12  {
13♪   List<double> fTemps = new List<Double>();          13♪   List<double> tempsInF = new List<Double>();
14♪   List<double> cTemps = new List<Double>();          14♪   List<double> tempsInC = new List<Double>();
15                                                       15
16    foreach (string s in args)                         16    foreach (string s in args)
17    {                                                  17    {
18    ▓▓▓▓▓▓▓▓▓▓▓▓▓▓▓▓▓▓▓▓▓▓▓▓▓▓▓▓▓▓                     18    ▓▓▓▓▓▓▓▓▓▓▓▓▓▓▓▓▓▓▓▓▓▓▓▓▓▓▓▓▓▓
19      {                                                19      {
20        if (s.Length > 0 && s.Substring(s.Length - 1).Equals("F  20        if (s.Length > 0 && s.Substring(s.Length - 1).Equals("F
21        {                                              21        {
22          string tempFString = s.Substring(0, s.Length - 1);  22          string tempFString = s.Substring(0, s.Length - 1);
23          double tempF = System.Convert.toDouble(tempFString)  23          double tempF = System.Convert.toDouble(tempFString)
24♪         fTemps.Add(tempF)                            24♪         tempsInF.Add(tempF)
25                                                       25
26♪         Console.WriteLine((tempF - 32 ) * (5.0 / 9.0));  26♪         Console.WriteLine(FtoC(tempF));
27        }                                              27        }
28                                                       28
29      }                                                29      }
30      if (s.Length > 0 && s.Substring(s.Length - 1).Equals("C"  30      if (s.Length > 0 && s.Substring(s.Length - 1).Equals("C"
31      {                                                31      {
32        string.tempCString = s.Substring(0, s.Length - 1);  32        string.tempCString = s.Substring(0, s.Length - 1);
33        double tempC = System.Covert.ToDouble(tempCString);  33        double tempC = System.Covert.ToDouble(tempCString);
34        cTemps.Add(tempC);                             34        tempsInC.Add(tempC);
35                                                       35
36♪ 304   Console.WriteLine(tempC * (9.0 / 5.0) + 32);    36♪       Console.WriteLine(tempC * (9.0 / 5.0) + 32);
37      }                                                37      }
38    }                                                  38    }
39  }                                                    39  }
40♪ if (fTemps.Count != 0)                               40♪ if (tempsInF.Count != 0)
41  {                                                    41  {
42♪   Console.WriteLine(MinTempInC(fTemps));             42♪   Console.WriteLine(MinTempInC(tempsInF));
43♪   Console.WriteLine(MaxTempInC(fTemps));             43♪   Console.WriteLine(MaxTempInC(tempsInF));
44  }                                                    44  }
45♪ if(cTemps.Count != 0)                                45♪ if(tempsInC.Count != 0)
46  {                                                    46  {
47♪   Console.WriteLine(MinTempInF(cTemps));             47♪   Console.WriteLine(MinTempInF(tempsInC));
48♪   Console.WriteLine(MaxTempInF(cTemps));        ▽    48♪   Console.WriteLine(MaxTempInF(tempsInC));        ▽
```

DISTINGUISHING PATTERN DIFFERENCES FROM NON-PATTERN DIFFERENCES

BACKGROUND

In computing, a diffing tool is a data comparison utility that computes and displays the differences (i.e., changes) between the contents of documents (e.g., files). Typically, diffing tools are used to show the differences between two (or more) versions of the same documents. A common use of diffing tools is to highlight the changes that have been made source code files.

For example, when using version control systems, such as git, subversion, mercurial, and the like, it is common for a developer to create a new branch from a main (or master) branch of a code repository. This new branch is a copy, or snapshot, of one or more files of the main branch. The developer is then free to contribute to this new branch (e.g., by adding, removing, and/or editing files), and eventually request to have those contributions merged into the main branch via a change proposal (e.g., in GitHub, via a pull request). Such change proposals typically comprise a set of differences, or diffs, between the content of files in both branches as a set of proposed changes to be merged into the main branch. Generally, the set of differences in a change proposal is reviewed a reviewer having write access to the main branch and are merged into the main branch if approved.

BRIEF SUMMARY

When there are a many differences between documents, it can be difficult to distinguish between repetitive differences that can be reviewed as a whole, and more unique differences. For example, when a developer contributes to a branch, those contributions often contain a mix of functional changes to source code (e.g., altering the logic of a function, changing a mathematical operation, changing a condition) and refactoring changes (e.g., renaming a variable, renaming a function) to the source code. Refactoring changes can generate many differences, even though all those differences are repetitive and frequently do not alter a program's function. As a result, the functional changes, which need to be carefully reviewed, can become lost in a forest of refactoring changes during review of a change proposal. This can lead to secondary negative effects, such as a reviewer glossing over significant structural changes, leading to coding errors being merged. Additionally, in some cases, reviewers may avoid review of change proposals that have many changes in favor of dealing with change proposals that have fewer changes. This can, in turn, lead to merge conflicts in which a repositories' main branch has been changed prior to the merger of the change proposal.

At least some embodiments described herein identify repetitive differences between the content of different versions of a document (e.g., refactoring changes in source code), based on identifying patterns in those differences. Since they are identified using patterns, these repetitive differences are referred to herein as "pattern differences." The embodiments described herein then hide or give a different visual treatment to pattern differences than they do to non-repetitive "non-pattern" differences when presenting a set of differences between these versions of the document. As a result, non-repetitive changes (e.g., functional changes in source code) stand out and can be easily reviewed. Thus, the embodiments herein enable a reviewer to quickly identify non-pattern differences, which are frequently of more importance to code review than pattern differences.

The embodiments herein therefore provide an improvement to the technical field of data visualization, and a technical effect, of providing a cleaner, clearer, and/or more focused visual presentation of information than conventional document difference visualization techniques. For example, conventional document difference visualization techniques merely displayed all differences with the same type of visual treatment (e.g., highlighting) regardless of whether they were repetitive or non-repetitive. Notably, when applied to code, such improvements can lead to higher quality code reviews (e.g., by making it easier for a code reviewer to spot significant structural changes) and can encourage quicker reviews of change proposals—which may avoid merge conflicts because changes that are merged sooner have fewer chances of colliding with subsequent changes.

In some aspects, the techniques described herein relate to a method, implemented at a computer system that includes a processor, for distinguishing pattern differences between different versions of a document, the method including: identifying a first version of the document and a second version of the document; identifying a set of differences, the set of differences including a plurality of differences between the first version of the document and the second version of the document; identifying a pattern explaining a transformation from a first string in the first version of the document to a second string in the second version of the document; identifying a subset of differences, the subset of differences including a plurality of differences, from among the set of differences, which match the pattern; and while presenting a user interface that visually highlights differences between the first version of the document and the second version of the document, based at least on a first difference of the set of differences being included in the subset of differences, applying a first visual treatment to the first difference; and based at least on a second difference of the set of differences being excluded from the subset of differences, applying a second visual treatment to the second difference, the second visual treatment being different than the first visual treatment.

In some aspects, the techniques described herein relate to a computer system for distinguishing pattern differences between different versions of a document, including: a processor; and a computer storage media that stores computer-executable instructions that are executable by the processor to cause the computer system to at least: identify a first version of the document and a second version of the document; identify a set of differences, the set of differences including a plurality of differences between the first version of the document and the second version of the document; identify a pattern explaining a transformation from a first string in the first version of the document to a second string in the second version of the document; identify a subset of differences, the subset of differences including a plurality of differences, from among the set of differences, which match the pattern; and while presenting a user interface that visually highlights differences between the first version of the document and the second version of the document, based at least on a first difference of the set of differences being included in the subset of differences, apply a first visual treatment to the first difference; and based at least on a second difference of the set of differences being excluded from the subset of differences, apply a second visual treatment to the second difference, the second visual treatment being different than the first visual treatment.

In some aspects, the techniques described herein relate to a computer program product including a computer storage media that stores computer-executable instructions that are executable by a processor to cause a computer system to distinguish pattern differences between different versions of a document, the computer-executable instructions including instructions that are executable by the processor to cause the computer system to at least: identify a first version of the document and a second version of the document; identify a set of differences, the set of differences including a plurality of differences between the first version of the document and the second version of the document; identify a pattern explaining a transformation from a first string in the first version of the document to a second string in the second version of the document; identify a subset of differences, the subset of differences including a plurality of differences, from among the set of differences, which match the pattern; and while presenting a user interface that visually highlights differences between the first version of the document and the second version of the document, based at least on a first difference of the set of differences being included in the subset of differences, apply a first visual treatment to the first difference; and based at least on a second difference of the set of differences being excluded from the subset of differences, apply a second visual treatment to the second difference, the second visual treatment being different than the first visual treatment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an example of a diffing user interface that highlights all differences between two versions of a document;

FIG. 3B illustrates an example of a diffing user interface that hides pattern differences between two versions of a document;

FIG. 3C illustrates an example of a diffing user interface that flags pattern differences;

FIG. 3D illustrates an example of a diffing user interface that flags partial matches;

FIG. 3E illustrates an example of a diffing user interface that includes a pattern difference management control.

DETAILED DESCRIPTION

At least some embodiments described herein identify repetitive differences between the content of different versions of a document, based on identifying patterns in those differences. The embodiments described herein then hide or give a different visual treatment to these repetitive or "pattern" differences versus non-repetitive or "non-pattern" differences when presenting a set of differences between these versions of the document. As a result, non-repetitive changes stand out and can be easily reviewed.

As used herein, a "pattern difference" is a difference between two versions of a document, and which matches an identified pattern that explains a transformation from a first string in one version of the document to a second string in another version of the document. Pattern differences are repetitive—occurring two or more times—such that a single pattern matches a plurality of pattern differences. As an example, a refactoring change to source code (e.g., renaming a variable, renaming a function) may be a pattern difference (e.g., if it occurs repeatedly). As used herein, a "non-pattern difference" is any difference for which there is no identified pattern. This may be because the difference only occurs once, or because no pattern has been identified for the difference (even if one could exist) even though it is repetitive. As an example, a structural change to source code (e.g., altering the logic of a function, changing a mathematical operation, changing a condition) may be a non-pattern difference. In some embodiments, differences are specified as part of a change proposal. As used herein, a "change proposal" comprises a set of differences between the content of files in two branches of a version control system repository (e.g., git, subversion, mercurial, and the like), and are a set of proposed changes to be merged from one branch to the other. One example of a change proposal is a pull request in GitHub.

Figure 1:
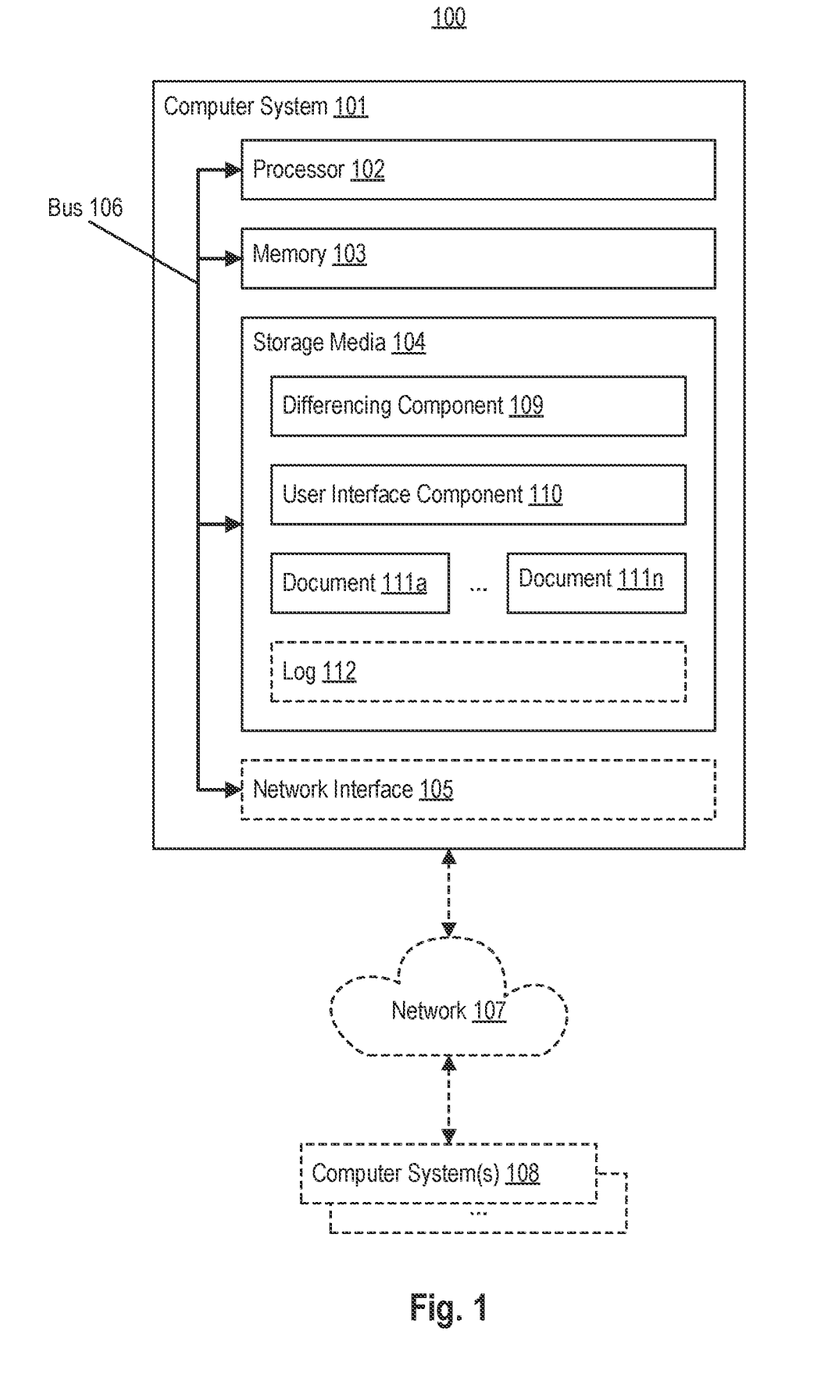
FIG. 1 illustrates an example computer architecture that facilitates distinguishing pattern differences between document versions from non-pattern differences between the document versions.

FIG. 1 illustrates an example computer architecture 100 that facilitates distinguishing pattern differences between document versions from non-pattern differences between the document versions. As shown, computer architecture 100 includes a computer system 101 comprising a processor 102 (or a plurality of processors), a memory 103, and a storage media 104, all interconnected by a bus 106. As shown, computer system 101 may also interconnect, via a network 107, to one or more computer system(s) 108 (i.e., using a network interface 105).

The storage media 104 is illustrated as storing computer-executable instructions implementing at least a differencing component 109 and a user interface component 110. In general, the differencing component 109 operates to identify a set of differences between contents of two (or more) different versions of a document, and to interoperate with the user interface component 110 to present those differences at a user interface. In embodiments, a set of differences between versions of a document describes one or more insertions, replacements, and/or deletions needed to transform one version of the document into another version of the document. Differences may be line-oriented or character-oriented. Either way, a difference identifies a string (i.e., one or more characters) in one version of a document that is different than a corresponding string in another version of the document (e.g., a replacement), or a string that exists in one version of the document but not another version of the document (e.g., an insertion or deletion).

The storage media 104 is also illustrated as storing different versions of a document 111 on which the differencing component 109 operates. As shown, these versions include at least a document 111a (i.e., a first version of document 111) and a document 111n (i.e., a second version of document 111). As indicated by ellipses, there can be any number of versions of the document 111. In some embodiments, one or more versions the document 111 are obtained from at least one of computer system(s) 108. However, one or more versions of the document 111 may originate at computer system 101 (e.g., via use of a document editor). The document 111 can comprise a variety of data but, in embodiments, document 111 comprises human-readable textual data, such as one or more passages of written human language, one or more portions of computer source code, computer-generated log data (e.g., relating to execution of a software component), and the like.

In some embodiments, document 111 comprises computer source code. In these embodiments, the differencing component 109 and/or the user interface component 110 may be part of an application this is usable as part of code editing and/or management. In various examples, this application is a dedicated diffing program, a generic text editor, an integrated development environment (IDE), a version control system front-end, and the like.

In some embodiments, the computer system 101 is an end-user computer system, such that the differencing component 109 operates with the user interface component 110 to present diffing results directly at the computer system 101 (e.g., at a display device connected thereto). In other embodiments, the computer system 101 is a server computer system, such that the differencing component 109 operates with the user interface component 110 to present diffing results to another computer system (e.g., one of computer system(s) 108) via the network 107.

In embodiments, the differencing component 109 operates to identify, from a set of a plurality of differences between two versions of a document, a subset of pattern differences, and to visually distinguish those pattern differences from other differences in the set when presenting the set of differences with the user interface component 110. This may include hiding or giving a different visual treatment to pattern differences versus non-pattern differences. For example, the differencing component 109 may visually highlight non-pattern differences, while presenting pattern-differences without highlighting—effectively deemphasizing or hiding the pattern-differences. As a result, non-pattern differences (e.g., non-repetitive changes) stand out and can be easily reviewed.

Figure 2:
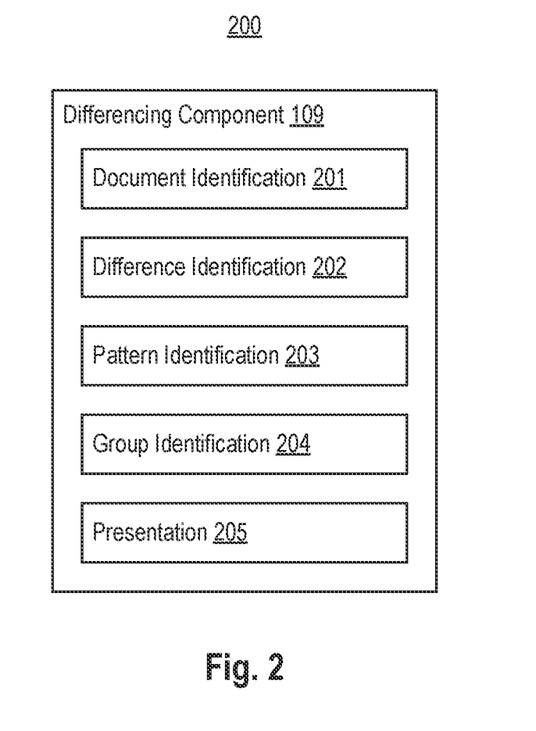
FIG. 2 illustrates an example of details of a differencing component.

FIG. 2 illustrates an example 200 of details of the differencing component 109 of FIG. 1. The differencing component 109 is shown as including a document identification component 201 and a difference identification component 202. In embodiments, the document identification component 201 identifies at least two versions of a document on which to perform a differencing analysis. In embodiments, the difference identification component 202 identifies a set of a plurality of differences (i.e., changes) between these document versions. In some embodiments, the document identification component 201 identifies each of a first and a second version of the document (e.g., document 111a and document 111n), and then the difference identification component 202 performs an analysis (e.g., based on edit distance) to determine the set of differences. In other embodiments, the document identification component 201 identifies a first version of the document (e.g., document 111a) and constructs the second version of the document based on a specification of the set of differences (e.g., as part of a change proposal, such as a GitHub pull request). In these embodiments, the difference identification component 202 identifies the set of differences from that specification.

In embodiments, the differencing component 109 presents this set of differences at a user interface, such as via an interaction between the presentation component 205 and the user interface component 110. For example, FIG. 3A illustrates an example of a diffing user interface 300a that highlights all differences between two versions of a document. In diffing user interface 300a there is a left pane 301 presenting a first version of a document (e.g., document 111a), and a right pane 302 presenting a second version of the document (e.g., document 111n). Additionally, when presenting these versions of the document, the diffing user interface 300a highlights each line that differs across the document versions. For example, when presenting lines 11 to 48 of the document, the diffing user interface 300a highlights lines 13, 24, 40, 42, and 43 due to changes renaming a list from 'fTemps' to 'tempsInF'; highlights lines 14, 34, 47, and 48 due to changes renaming a list from 'cTemps' to 'tempsInC'; highlights line 18 due to changing a '!' character to an '=' character (i.e., a condition of inequality to a condition of equality); and highlights line 26 due to a change that calls a function (i.e., 'FtoC(tempF)') rather than expressly computing a Fahrenheit to Celsius conversion (i.e., '(tempF−31)*(5.0/9.0)').

It is noted that there could be other differences between the first and second versions of the document that are not shown in the diffing user interface 300a, since the line(s) corresponding to those difference are not presently being presented at the diffing user interface 300a. Additionally, it is noted that, while the diffing user interface 300a highlights entire lines, the diffing user interface 300a could additionally, or alternatively, highlight particular characters that have changed on those lines.

Notably, many of the changes shown in FIG. 3A are refactoring changes (e.g., renaming 'fTemps' to 'tempsInF'; renaming 'cTemps' to 'tempsInC'; and moving a temperature conversion into a function called FtoC) and are unlikely to affect program function. By highlighting all changes with the same visual treatment, a potentially important (and detrimental) structural change (i.e., changing the condition on line 18 from inequality to equality) may be easy to miss when reviewing the changes made in the second version of the document.

To improve on the presentation of differences, the differencing component 109 also includes a pattern identification component 203 and a group identification component 204. In embodiments, the pattern identification component 203 identifies, for each of one or more differences identified by the difference identification component 202, a pattern that explains a transformation from a string in one version of a document to a corresponding string in a second version of the document. In some embodiments, the pattern identification component 203 identifies patterns for each difference identified by the difference identification component 202, while in other embodiments the pattern identification component 203 only identifies patterns that would match two or more of the differences identified by the difference identification component 202.

In some embodiments, a pattern is a simple substitution. For example, referring to FIG. 3A, a first pattern explaining the difference at line 13 may be a substitution of the string 'fTemps' in the version of the document presented in the left pane 301 with the string 'tempsInF' in the version of the document presented in the right pane 302, and a second pattern explaining the difference at line 14 may be a substitution of the string 'cTemps' in the version of the document presented in the left pane 301 with the string 'tempsInC' in the version of the document presented in the right pane 302. In other embodiments, a pattern is search pattern, such as a regular expression or other domain-specific language, that includes wildcards, variables, and the like, and that is used by a string-searching algorithm for "find" or "find and replace" operations on strings. For example, a third pattern explaining the difference at line 26 may be a regular expression matching the expression '\((\w+)\s*-\s*32\)\s*\*\s*\(5\.0\s*/\s*9 \.0\)' in the version of the document presented in the left pane 301 and matching the expression 'FtoC($1)' in the version of the document presented in the right pane 302. Notably, by using search patterns, embodiments can match a single pattern to differences that are not identical. For example, the foregoing regular expression would also match a difference that operates on a variable labeled 'tempC' rather than 'temp F'.

In embodiments, for a given pattern, the group identification component 204 identifies a subset of the differences identified by the difference identification component 202 that match the pattern. In embodiments, this subset is a group of two or more pattern differences that match that pattern. For example, in the context of the diffing user interface 300a, the group identification component 204 may identify a first subset of pattern differences (e.g., including at least lines 13, 24, 40, 42, and 43) for the first pattern substituting 'fTemps' with 'tempsInF'; identify a second subset of pattern differences (e.g., including at least lines 14, 34, 47, and 48) for the second pattern substituting 'cTemps' with 'tempsInC'; and identify a third subset of pattern differences (e.g., including at least line 26, along with at least one other line not shown in FIG. 3A) for the third pattern comprising the regular expression substituting the expression '\((\w+)\s*-\s*32\)\s*\*\s*\(5\.0\s*/\s*9\.0\)' with the expression 'FtoC($1)'.

In some embodiments, the pattern identification component 203 generates one or more patterns based on receipt of user input identifying each side of a transformation (e.g., receipt of user input at diffing user interface 300a selecting 'fTemps' at line 13 in left pane 301 and selecting 'tempsInF' at line 13 in right pane 302). Additionally, or alternatively, in some embodiments the pattern identification component 203 automatically generates one or more patterns based on performing an analysis of the differences identified by the difference identification component 202. Additionally, or alternatively, in some embodiments the pattern identification component 203 identifies one or more patterns from a log 112 that specifies those patterns.

In some embodiments, log 112 is generated based on prior operation of the differencing component 109. In other embodiments, log 112 is received a part of a change proposal. In other embodiments, log 112 is generated by a language service of an IDE (e.g., as a user makes refactoring changes in the IDE). In any of these embodiments, the log 112 may be generated at the computer system 101 or be received from at least one of computer system(s) 108.

In embodiments, based on operation of the pattern identification component 203 and the group identification component 204, the presentation component 205 interacts with the user interface component 110 to apply a different visual treatment to repetitive or pattern differences that are identified by the group identification component 204 than a visual treatment applied to other differences identified by the difference identification component 202 (e.g., non-repetitive or non-pattern differences). In embodiments, this different visual treatment operates to hide or otherwise deemphasize the pattern differences, as compared to non-pattern differences.

For example, FIG. 3B illustrates an example of a diffing user interface 300b that hides pattern differences between two versions of a document. Diffing user interface 300b is identical to the diffing user interface 300a of FIG. 3A, except that only the difference at line 18 has been highlighted. Here, the presentation component 205 has applied one visual treatment (i.e., no visual highlight) to pattern differences that are being displayed—including lines 13, 24, 40, 42, and 43 from the first subset of pattern differences; lines 14, 34, 47, and 48 from the second subset of pattern differences; and line 25 from the third subset of pattern differences. The presentation component 205 has also applied another visual treatment (i.e., a visual highlight) to the non-pattern difference that is being displayed at line 18. Here, the pattern differences have been deemphasized (hidden, in this case, by not highlighting them), such that the non-pattern difference at line 18 stands out. This provides a cleaner, clearer, and/or more focused visual presentation of information than the more conventional presentation of diffing user interface 300a.

Notably, applying a different visual treatment to pattern differences than non-pattern differences can take any form. For example, FIG. 3C illustrates an example of a diffing user interface 300c that flags pattern differences. In diffing user interface 300c, in addition to presenting pattern differences without a visual highlight, the presentation component 205 has also presented a flag in connection with each pattern difference. For example, diffing user interface 300c includes a flag 303 in connection with line 26, as well as similar flags in connection with other lines that correspond to a non-pattern difference.

In some embodiments, the differencing component 109 operates to use partial pattern matching to identify potentially missed opportunities for making a repetitive (e.g., refactoring) change. For instance, previously described was a refactoring change (i.e., line 26) calling the function 'FtoC' rather than expressly computing a Fahrenheit to Celsius conversion (i.e., '(tempF−31)*(5.0/9.0)'). Suppose that the pattern identification component 203 had also identified a similar refactoring change calling the function 'CtoF' rather than expressly computing a Celsius Fahrenheit to conversion (e.g., 'tempC*(9.0/5.0)+32'). In embodiments, this may be based on differences not presently shown in diffing user interface 300c (e.g., lines 1 to 10, or a line beyond line 48), based on log 112, etc. In these embodiments, the pattern identification component 203 may identify a fourth pattern comprising a regular expression replacing the expression '(\w+)\s*\*\s*\(9\.0\s*/\s*5 \.0\)\s*\+\s*32' with the expression 'CtoF ($1)'. Here, the differencing component 109 can determine that there is a partial match to line 36; that is, the expression '(\w+)\s*\*\s*\(9\.0\s*/\s*5\.0\)\s*\+\s*32' matches to 'tempC*(9.0/5.0)+32' in line 36 of the left pane 301, but the expression 'CtoF ($1)' does not match to line 36 in the right pane 302. As such, this may be a missed opportunity to have used a new 'CtoF' function. For example, it is possible that line 36 in of the left pane 301 could have been changed to 'Console.WriteLine(CtoF(tempC));'.

In embodiments, based on an identification of a potentially missed opportunities for making a repetitive (e.g., refactoring) change, the presentation component 205 provides an indication of those opportunities. For example, FIG. 3D illustrates an example of a diffing user interface 300*d* that flags partial matches. In diffing user interface 300*d*, line 36 has been associated with a flag 304 (shown in the example as being a black flag, as opposed to the white flags used to indicate the presence of a pattern change) indicating the potentially missed refactoring opportunity. In some embodiments, diffing user interface 300*d* provides an option for a user to elect to make the change.

In embodiments, the presentation component 205 provides one or more user interface controls relating to creating, removing, displaying, and interacting with pattern differences. These user interface controls can take a variety of forms, such as context menus, popups, panes, etc. To illustrate one example, FIG. 3E illustrates an example of a diffing user interface 300*e* that includes a pattern difference management control. Here, diffing user interface 300*e* includes a control 305 comprising a popup. Control 305 may be invoked in a variety of ways, such as by interacting with a flag (e.g., flag 303 or flag 303), via a menu item, via a context menu, via a status bar item, and the like.

In the example, the control 305 lists a rule created for each pattern. For example, control 305 includes a rule called 'fTemps' (e.g., corresponding to the first pattern discussed supra), a rule called 'tempC*(9.0/5.0)+32' (e.g., corresponding to the fourth pattern discussed supra), a rule called '(tempF−31)*(5.0/9.0)' (e.g., corresponding to the third pattern discussed supra), and a rule called 'cTemps' (e.g., corresponding to the second pattern discussed supra). In the example, the control 305 also lists how many differences that are covered by that rule (i.e., how many differences are in a subset of differences matching the rule), and options for interacting with those rules. For example, each rule is associated with a filter button; in embodiments, selection of the filter button enables or disables using a different visual treatment for differences covered by that rule (e.g., to enable/disable the rule). Additionally, each rule is associated with a check mark button; in embodiments, selection of the checkmark button accepts all differences covered by that rule in a version control system, such as git, subversion, mercurial, and the like, and then hides those differences in the diffing user interface 300*e* (e.g., by enabling the filter button). Although not shown, other functionality is also possible, such as a button that initiates creation of a comment that is associated with the rule (e.g., for inclusion in a change proposal), a button that deletes the rule, etc.

The differencing component 109 is now further described in connection with FIG. 4, which illustrates a flow chart of an example method 400 for distinguishing pattern differences between different versions of a document from non-pattern-differences. In embodiments, instructions for implementing method 400 are encoded as computer-executable instructions (e.g., differencing component 109, user interface component 110) stored on a computer program product (e.g., storage media 104) that are executable by a processor (e.g., processor 102) to cause a computer system (e.g., computer system 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4:
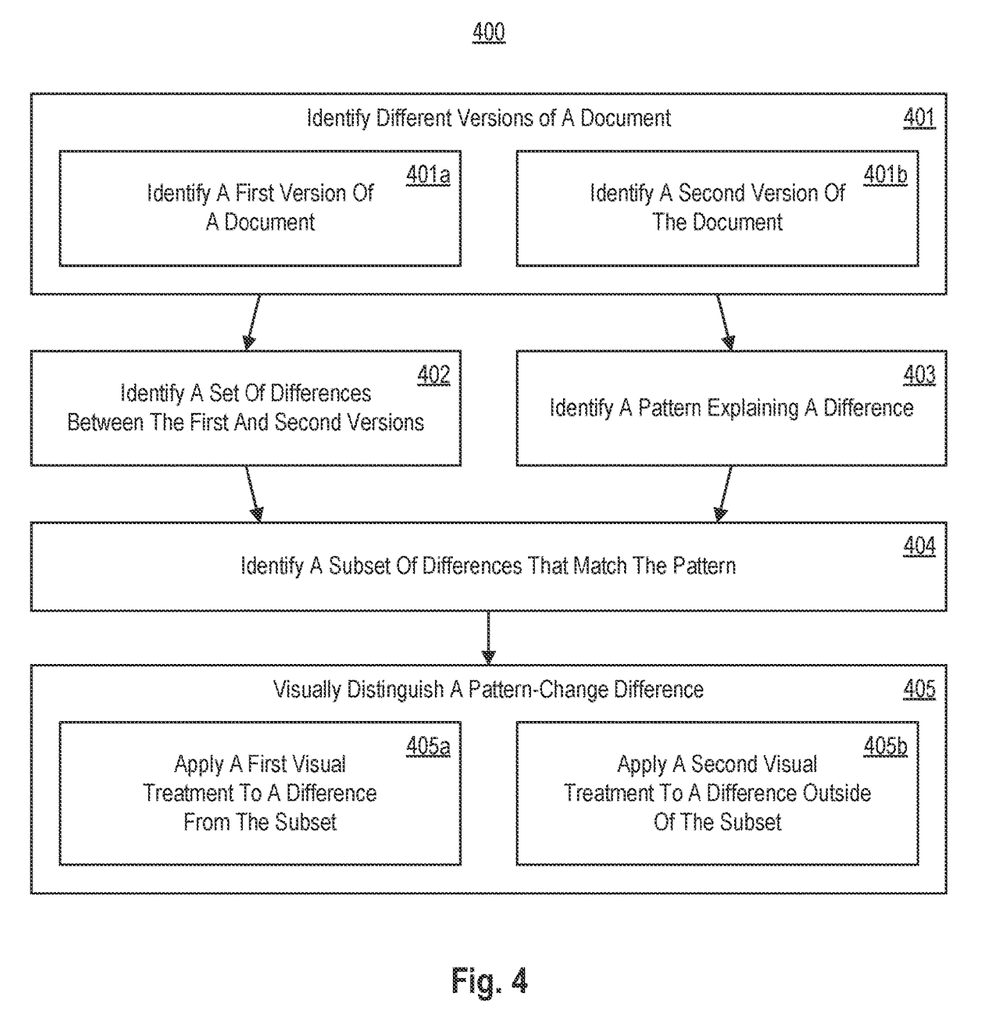
FIG. 4 illustrates a flow chart of an example method for distinguishing pattern differences between different versions of a document from non-pattern-differences.

Referring to FIG. 4, method 400 comprises an act 401 of identifying different versions of a document. As shown, act 401 includes and act 401*a* of identifying a first version of a document, and an act 401*b* of identifying a second version of the document. In an example, the document identification component 201 identifies the document 111*a* (e.g., as shown in the left pane 301 of FIGS. 3A-3E) as a first version of document 111, and identifies the document 111*n* (e.g., as shown in the right pane 302 of FIGS. 3A-3E) as a second version of document 111 (e.g., based on accessing document 111*n* directly, or by reconstructing document 111*n* from a specification of differences). As shown, there is no ordering requirement between act 401*a* and act 401*b*; thus, these acts may be performed serially (in either order), or in parallel.

Method 400 also comprises an act 402 of identifying a set of differences between the first and second versions. In some embodiments, act 402 comprises identifying a set of differences, the set of differences comprising a plurality of differences between the first version of the document and the second version of the document. In an example, the difference identification component 202 identifies a set of a plurality of differences between document 111*a* and document 111*n*, such as those differences discussed in connection with FIGS. 3A-3E. In embodiments, the difference identification component 202 performs an analysis (e.g., based on edit distance) on document 111*a* and document 111*n* to determine the set of differences. In other embodiments, the difference identification component 202 determine the set of differences based on a specification of the set of differences (e.g., as part of a change proposal, as part of log 112).

Method 400 also comprises an act 403 of identifying a pattern explaining a difference. In some embodiments, act 403 comprises identifying a pattern explaining a transformation from a first string in the first version of the document to a second string in the second version of the document. In an example, the pattern identification component 203 identifies a first pattern explaining the difference at line 13 (e.g., a substitution of the string 'fTemps' with the string 'tempsInF'), identifies a second pattern explaining the difference at line 14 (e.g., substitution of the string 'cTemps' with the string 'tempsInC'), identifies a third pattern explaining the difference at line 26 (e.g., a regular expression substituting the expression '\((\w+)\s*−\s*32\)\s*\*\s*\(5\.0\s*/\s*9\.0\)' with the expression 'FtoC($1)'), and the like.

As described, a pattern may comprise a substitution (e.g., the first and second patterns), or a search pattern such as a regular expression (e.g., the third pattern). Thus, in embodiments of act 403, the pattern comprises at least one of a substitution or a search pattern.

As described, the pattern identification component 203 may identify a pattern based on receipt of user input identifying each side of a transformation, based on analysis of the differences identified by the difference identification component 202, and/or based on a log 112 that specifies those patterns. Thus, in embodiments of act 403, the pattern is identified based on at least one of (i) receiving a user input identifying the first string and the second string, (ii) an automated pattern analysis between the first version of the document and the second version of the document, or (iii) reading one or more patterns from a log.

As described, a log 112 may be received a part of a change proposal request or may be generated by a language service of an IDE (e.g., as a user makes refactoring changes in the IDE). Thus, in embodiments of act 403, the pattern is identified based on the log, and the log is included in a change proposal, or is generated by a language service of an IDE based on one or more code refactoring changes.

As shown, there is no ordering requirement between act 402 and act 403; thus, these acts may be performed serially (in either order), or in parallel.

Method 400 also comprises an act 404 of identifying a subset of differences that match the pattern. In some embodiments, act 404 comprises identifying a subset of differences, the subset of differences comprising a plurality of differences, from among the set of differences, which match the pattern. In an example, for a given pattern identified in act 403, the group identification component 204 identifies—from among the set of differences identified in act 402—a subset of differences as a plurality of pattern differences matching the pattern. For instance, the group identification component 204 may identify a first subset of pattern differences (e.g., including at least lines 13, 24, 40, 42, and 43) for the first pattern substituting 'fTemps' with 'tempsInF'; may identify a second subset of pattern differences (e.g., including at least lines 14, 34, 47, and 48) for the second pattern substituting 'cTemps' with 'tempsInC'; and may identify a third subset of pattern differences (e.g., including at least line 26, along with at least one other line not shown in FIGS. 3A-3E) for the third pattern comprising the regular expression substituting the expression '\((\w+)\s*-\s*32\)\s*\*\s*\(5\.0\s*/\s*9\.0\)' with the expression 'FtoC($1)'.

Method 400 also comprises an act 405 of visually distinguishing a pattern-change difference. In some embodiments, act 405 comprises, while presenting a user interface that visually highlights differences between the first version of the document and the second version of the document, applying visual treatments to differences. As shown, act 405 includes an act 405a of applying a first visual treatment to a difference from the subset. In some embodiments, act 405a comprises, based at least on a first difference of the set of differences being included in the subset of differences, applying a first visual treatment to the first difference. In an example, diffing user interface 300b presents each displayed pattern change difference without a highlighting, while diffing user interface 300c and diffing user interface 300d present each displayed pattern change difference with a flag. Thus, in some embodiments of act 405a, the first visual treatment is one or more of a non-highlight or a flag. However, it will be appreciated by one of ordinary skill in the art that a variety of visualization techniques could be used for the first visual treatment.

As shown, act 405 also includes an act 405b of applying a second visual treatment to a difference outside of the subset. In some embodiments, act 405b comprises, based at least on a second difference of the set of differences being excluded from the subset of differences, applying a second visual treatment to the second difference, the second visual treatment being different than the first visual treatment. In embodiments, the first visual treatment is visually deemphasized compared to the second visual treatment. In an example, diffing user interfaces 300b-300c present each displayed difference that is not a pattern change difference with highlighting. Thus, in some embodiments of act 405b the second visual treatment is a highlight. However, it will be appreciated by one of ordinary skill in the art that a variety of visualization techniques could be used for the second visual treatment.

As shown, there is no ordering requirement between act 405a and act 405b; thus, these acts may be performed serially (in either order), or in parallel.

Technical improvements and technical effects of method 400 include providing a cleaner, clearer, and/or more focused visual presentation of information than conventional document difference visualization techniques. For example, conventional document difference visualization techniques merely displayed all differences with the same type of visual treatment (e.g., highlighting) regardless of whether they were repetitive or non-repetitive.

As described, in some embodiments the differencing component 109 operates to use partial pattern matching to identify potentially missed opportunities for making a repetitive (e.g., refactoring) change. For instance, as discussed in connection with FIG. 3D, the differencing component 109 may determine that there is a partial match to line 36; that is, the expression '(\w+)\s*\*\s*\(9\.0\s*/\s*5\.0\)\s*\+\s*32' matches to 'tempC*(9.0/5.0)+32' in line 36 of the left pane 301, but the expression 'CtoF ($1)' does not match to line 36 in the right pane 302. As such, this may be a missed opportunity to use a new 'CtoF' function. Thus, in diffing user interface 300d, the presentation component 205 associates line 36 with a flag 304 that indicates the potentially missed refactoring opportunity. Thus, in some embodiments, method 400 also comprises identifying a pairing of identical strings, between the first version of the document and the second version of the document, which partially match the pattern; and while presenting the user interface, applying a third visual treatment to at least one of the identical strings, the third visual treatment being different from the first visual treatment and the second visual treatment. Here, technical improvements and technical effects of method 400 include providing automated assistance in identifying missed refactoring changes.

As described, in some embodiments a log 112 describing a set of patterns is generated based on prior operation of the differencing component 109. Thus, in some embodiments, method 400 also comprises storing the pattern to a log.

As described, some embodiments include a user interface control (e.g., control 305) that lists a rule created for each pattern and enables those rules to be interacted with (e.g., a filter that that enables or disables using a different visual treatment for differences covered by that rule, a button that deletes the rule, etc.). Thus, some embodiments of method 400 also comprise presenting a user interface element that includes one or more rules that is each associated with a corresponding pattern, presence of each rule causing the user interface to apply the first visual treatment to one or more differences matching the corresponding pattern, and wherein the user interface element enables receipt of a user input to remove each rule.

As described, some embodiments include a user interface control (e.g., a checkmark button within control 305) that, when selected, accepts all differences covered by that rule in a version control system, such as git, subversion, mercurial, and the like. Thus, some embodiments of method 400 also comprise presenting a selectable user interface control that, when selected, initiates an approval of all differences in the subset of differences. Notably, this provides an improved user interface interaction, by enabling all differences in a group to be accepted with a single user input, rather than a different user input for each difference in the group.

As described, some embodiments include a user interface control that initiates creation of a comment that is associated with the rule (e.g., for inclusion in a change proposal). Thus, some embodiments of method 400 also comprise associating a comment with the subset of differences.

In some embodiments, the pattern identification component 203 generates a pattern (and/or rule) based on a user interaction accepting difference, and then the presentation component 205 automatically hides all differences matching the pattern. Thus, some embodiments of method 400 also comprises receiving a user input accepting the first difference; and based on the user input, generating a rule for the pattern, the rule causing all differences in the subset of differences to be hidden while presenting the user interface. In some embodiments, this user input also initiates an approval of all differences in the subset of differences.

Accordingly, the embodiments described herein identify repetitive differences between the content of different versions of a document, based on identifying patterns in those differences. These embodiments then hide or give a different visual treatment to these repetitive or "pattern" differences versus non-repetitive or "non-pattern" differences when presenting a set of differences between these versions of the document. As a result, non-repetitive changes stand out and can be easily reviewed.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system, and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for distinguishing pattern differences between different versions of a document from non-pattern-differences, the method comprising:
    identifying a first version of the document and a second version of the document;
    identifying a set of differences, the set of differences comprising a plurality of differences between the first version of the document and the second version of the document;
    identifying a pattern explaining a transformation from a first string in the first version of the document to a second string in the second version of the document;
    identifying a subset of differences, the subset of differences comprising a plurality of differences, from among the set of differences, which match the pattern; and
    while presenting a user interface that visually highlights differences between the first version of the document and the second version of the document,
        based at least on a first difference of the set of differences being included in the subset of differences, applying a first visual treatment to the first difference;
        based at least on a second difference of the set of differences being excluded from the subset of differences, applying a second visual treatment to the second difference, the second visual treatment being different than the first visual treatment;
        receiving a user input accepting the first difference; and
        based on the user input, generating a rule for the pattern, the rule causing all differences in the subset of differences to be hidden while presenting the user interface.

2. The method of claim 1, wherein the pattern comprises at least one of a substitution or a search pattern.

3. The method of claim 1, wherein the pattern is identified based on at least one of:
    receiving a user input identifying the first string and the second string;
    an automated pattern analysis between the first version of the document and the second version of the document; or
    reading one or more patterns from a log.

4. The method of claim 3, wherein the pattern is identified based on the log, and wherein the log is included in a change proposal.

5. The method of claim 3, wherein the pattern is identified based on the log, and wherein the log is generated by a language service of an integrated development environment based on one or more code refactoring changes.

6. The method of claim 1, wherein the first visual treatment is visually deemphasized compared to the second visual treatment.

7. The method of claim 1, wherein:
    the first visual treatment is one or more of a non-highlight or a flag; and
    the second visual treatment is a highlight.

8. The method of claim 1, further comprising:
    identifying a pairing of identical strings, between the first version of the document and the second version of the document, which partially match the pattern; and
    while presenting the user interface, applying a third visual treatment to at least one of the identical strings, the third visual treatment being different from the first visual treatment and the second visual treatment.

9. The method of claim 1, further comprising presenting a selectable user interface control that, when selected, initiates an approval of all differences in the subset of differences.

10. The method of claim 1, further comprising associating a comment with the subset of differences.

11. The method of claim 1, further comprising storing the pattern to a log.

12. The method of claim 1, further comprising presenting a user interface element that includes one or more rules that are each associated with a corresponding pattern, presence of each rule causing the user interface to apply the first visual treatment to one or more differences matching the corresponding pattern, and wherein the user interface element enables receipt of a user input to remove each rule.

13. A computer system for distinguishing pattern differences between different versions of a document from non-pattern-differences, comprising:
    a processor; and
    a computer storage media that stores computer-executable instructions that are executable by the processor to cause the computer system to at least:
        identify a first version of the document and a second version of the document;
        identify a set of differences, the set of differences comprising a plurality of differences between the first version of the document and the second version of the document;

identify a pattern explaining a transformation from a first string in the first version of the document to a second string in the second version of the document;

identify a subset of differences, the subset of differences comprising a plurality of differences, from among the set of differences, which match the pattern; and while presenting a user interface that visually highlights differences between the first version of the document and the second version of the document, based at least on a first difference of the set of differences being included in the subset of differences, apply a first visual treatment to the first difference;

based at least on a second difference of the set of differences being excluded from the subset of differences, apply a second visual treatment to the second difference, the second visual treatment being different than the first visual treatment; and present a user interface element that includes one or more rules that are each associated with a corresponding pattern, presence of each rule causing the user interface to apply the first visual treatment to one or more differences matching the corresponding pattern, the user interface element enabling receipt of a user input to remove each rule.

14. The computer system of claim 13, wherein the pattern comprises at least one of a substitution or a search pattern.

15. The computer system of claim 13, wherein the pattern is identified based on at least one of:

receiving a user input identifying the first string and the second string;

an automated pattern analysis between the first version of the document and the second version of the document; or reading one or more patterns from a log.

16. The computer system of claim 15, wherein the pattern is identified based on the log, and wherein the log is included in a change proposal.

17. The computer system of claim 13, wherein the first visual treatment is visually deemphasized compared to the second visual treatment.

18. The computer system of claim 13, wherein the computer-executable instructions also include instructions that are executable by the processor to cause the computer system to:

identify a pairing of identical strings, between the first version of the document and the second version of the document, which partially match the pattern; and while presenting the user interface, apply a third visual treatment to at least one of the identical strings, the third visual treatment being different from the first visual treatment and the second visual treatment.

19. A computer program product comprising a computer storage media that stores computer-executable instructions that are executable by a processor to cause a computer system to distinguish pattern differences between different versions of a document from non-pattern-differences, the computer-executable instructions including instructions that are executable by the processor to cause the computer system to at least:

identify a first version of the document and a second version of the document;

identify a set of differences, the set of differences comprising a plurality of differences between the first version of the document and the second version of the document;

identify a pattern explaining a transformation from a first string in the first version of the document to a second string in the second version of the document;

identify a subset of differences, the subset of differences comprising a plurality of differences, from among the set of differences, which match the pattern; and while presenting a user interface that visually highlights differences between the first version of the document and the second version of the document, based at least on a first difference of the set of differences being included in the subset of differences, apply a first visual treatment to the first difference;

based at least on a second difference of the set of differences being excluded from the subset of differences, apply a second visual treatment to the second difference, the second visual treatment being different than the first visual treatment;

receive a user input accepting the first difference; and based on the user input, generate a rule for the pattern, the rule causing all differences in the subset of differences to be hidden while presenting the user interface.

20. The computer system of claim 13, wherein the computer-executable instructions also include instructions that are executable by the processor to cause the computer system to:

receive a user input accepting the first difference; and based on the user input, generate a rule for the pattern, the rule causing all differences in the subset of differences to be hidden while presenting the user interface.

* * * * *